Figure 1:
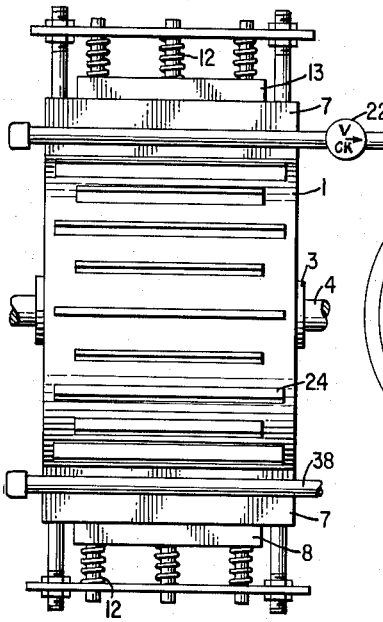

June 26, 1962  P. YALNIZYAN  3,040,530
ROTARY EXTERNAL COMBUSTION ENGINE
Filed May 14, 1959  2 Sheets-Sheet 1

INVENTOR

United States Patent Office 3,040,530
Patented June 26, 1962

3,040,530
ROTARY EXTERNAL COMBUSTION ENGINE
Puzant Yalnizyan, 204 Bayview Heights,
Toronto 17, Ontario, Canada
Filed May 14, 1959, Ser. No. 813,292
6 Claims. (Cl. 60—39.61)

This invention relates to new and useful mechanical design and arrangements for converting the thermal energy of liquid or gas fuels to mechanical energy.

In particular, the present invention is directed to a novel arrangement of parts whereby a single cylindrical rotator equipped with a certain number of impeller vanes rotates in another stable cylinder called stator, a shaft being directly fixed to the rotor is seated in two ball bearings fixed in stator and rotates together with rotor providing rotary mechanical energy, forming therefore a simple, durable and compact rotary engine.

Actual internal combustion engines having a plurality of cylinders, pistons, rods, valves, crank shaft, valve shaft etc., all are expensive to manufacture, operate and service, due to the complexity of their construction and method of operation. In the past certain rotary internal combustion engines have been designed but, due to their further complexity, never have been able to be marketed. Accordingly it is an object of my invention to provide a rotary internal combustion engine simple, durable and compact with a minimum number of parts and readily operated with maximum efficiency and which will be considerably less expensive to manufacture, operate and service than any of the known internal combustion engines.

Another object of my invention is to provide a very light weight engine as compared with that of conventional piston-cylinder internal combustion engines, for a given horsepower output.

A further object of my invention is to provide a rotary engine having less/or no wearing of materials except that of seals, thus keeping the compression ratio and its high efficiency for longer life, due to the fact that there will be no metal to metal contact except for the seals. This improvement renders all other similar engines obsolete.

Another object of my invention is to provide an engine having no reciprocating elements (except the valves), therefore to save all the kinetic energy now spent provided that the explosions or power impulses are transmitted directly to the periphery of the rotor without any further mechanical intermediates and, as a result, to increase the efficiency about 11–13% over the existing efficiencies.

Another object of my invention is to provide a self-cooled engine, cooling done by ventilated air externally and by forced air internally. Having an isolated combustion chamber, the combustion temperatures can be easily controlled, consequently higher thermal efficiency may be provided. This feature will serve also to provide for the self ignition, once the engine has started and has reached a certain temperature.

Another object of my invention is to provide an internal combustion engine in which, for each rotation, two or more explosions or power impulses are transmitted directly to the rotor, thereby diminishing to a minimum the vibrations and the power impulses being applied at the periphery of the rotor at the maximum distance from the centre of the rotation to increase the leverage of the power stroke to its maximum efficiency.

Another object of my invention is to provide an internal combustion engine having less limitations for sizes than the conventional internal combustion engines.

A still further object of my invention is to provide an engine which is simple and easy to manufacture and which can be placed on the market at a reasonable cost.

A still further object of my invention is to provide an engine which may operate either clockwise or counter clockwise without any re-arrangement of the engine by simple reason of the possibility of utilizing both ends of the shaft which may be free.

With the foregoing in view, my invention and improvements fall within the novel subject matter hereinafter described in detail and claimed in the specifications and drawings set forth.

Figure 2:
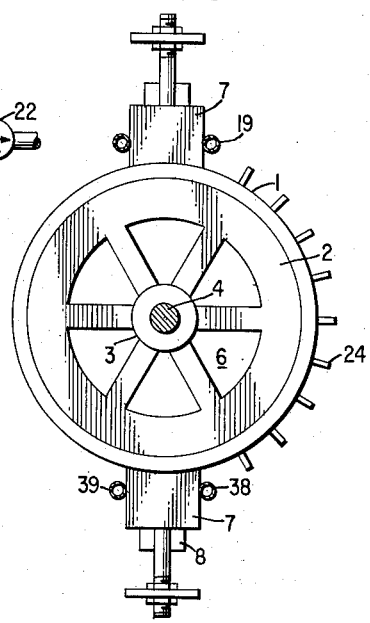
Figure 4:
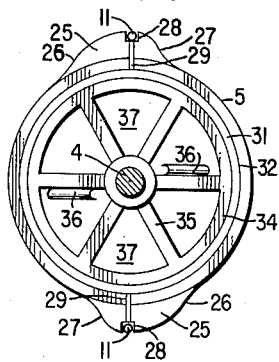
Figure 3:
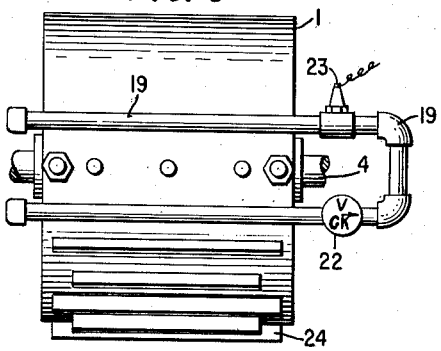
Figure 6:
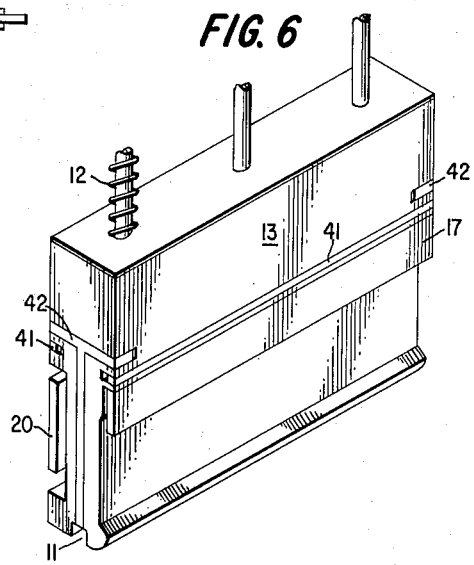
Figure 7:
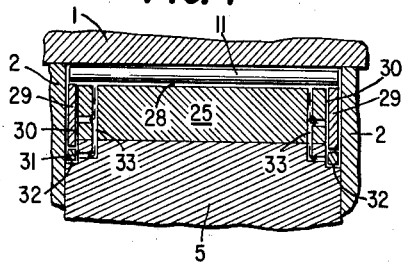
Figure 5:
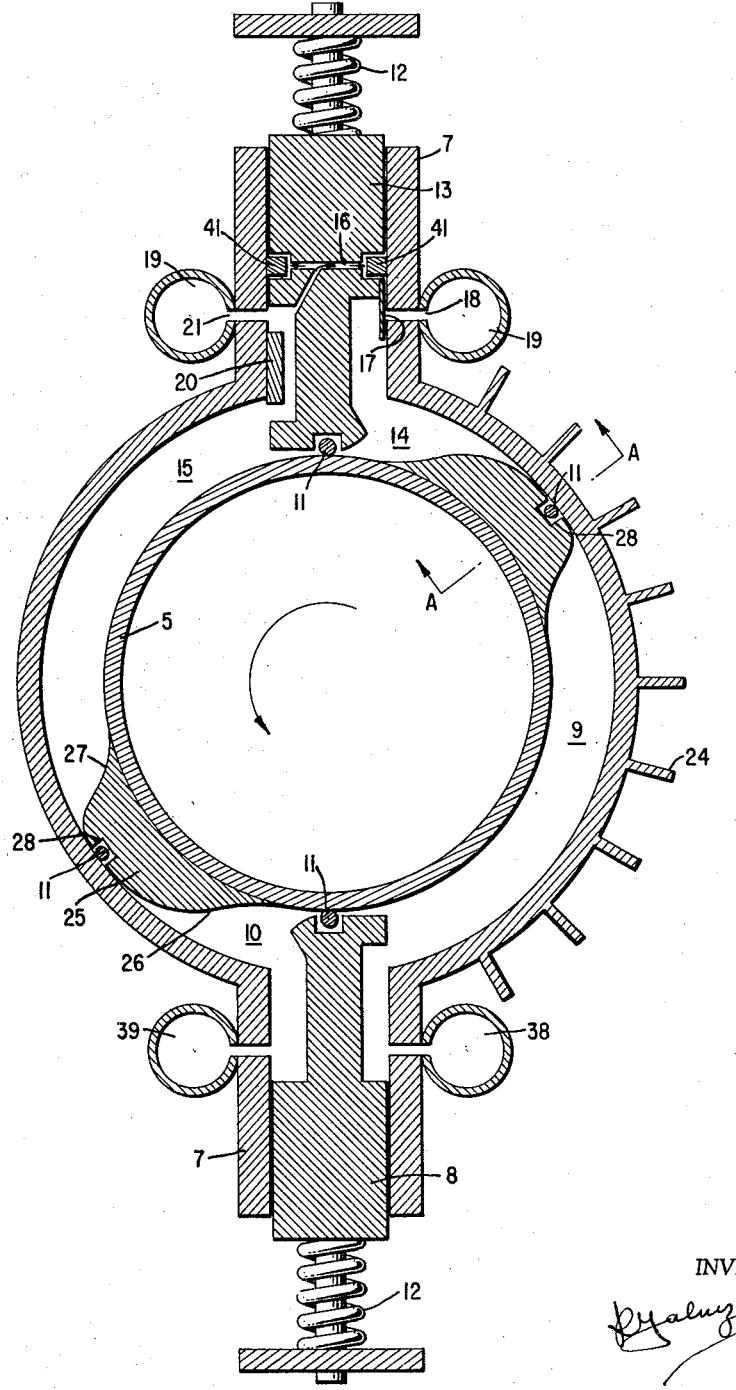

In the drawings:
FIGURE 1 is an outside elevation of the engine body.
FIGURE 2 is a front elevation of the same, and
FIGURE 3 is a plan view of the same.
FIGURE 4 is a front elevation of the rotor alone.
FIGURE 5 is a vertical section of the engine assembled including the rotor.
FIGURE 6 is a view in perspective showing upper valve including the seals.
FIGURE 7 is a partial section of rotor and stator through line A—A of FIGURE 5 showing details of seals and channels proving that there is no metal to metal contact between stator and rotor other than seals.

Like reference numerals apply to like parts throughout the specification and drawings.

The embodiment of my invention shown in the drawings comprises a stator 1 without a base (the base may be of any suitable or desired construction depending upon the location and the purpose for which the engine will be used). The stator 1 is a perfect cylindrical shape having two end covers 2 housing ball bearings 3 to hold the shaft 4 of the rotor 5.

The end covers 2 of the stator have also louvres 6 on both ends to provide air circulation in the interior of the engine for internal cooling.

The rotor is accessible simply by removing one of the end covers 2 of the stator.

The valve housings 7 are fixed also on the stator 1, the two valves are a different shape and designed for different duties. Valve 8 simply separates the intake chamber 9 from the exhaust chamber 10, being adjusted in valve housing 7 and seated on the rotor 5 by a roller 11 under the pressure of springs 12. The chambers 9 and 10 are under relatively close pressures.

The valve 13 having an important function is shown separately in FIGURE 6 with its major components. The valve 13 separates compression chamber 14 from expansion chamber 15. The relative pressures in the chambers 14 and 15 may vary greatly.

The valve 13 has certain similar components to the valve 8 such as the roller 11, springs 12 etc. However, it has in addition metallic seals such as horizontal seals 41 and T seals 42.

These seals have the effect of preventing the mixing of the burnt gases with the fresh gases under the process of compression.

The channels 16 carry pressure from explosion chamber behind the seals 41 and 42 to keep them tight against the valve housing walls.

The other major components of the valve 13 are the metallic sub-valve 17, which closes the entry port 18 preventing compressed gases from entering the combustion chamber 19 before the compression process is accomplished as during the explosion process the vertical wall 20 prevents gases from entering the expansion chamber 15 because the valve 13 being elevated, the vertical wall 20 is raised to close the entry port 21.

The combustion chamber 19 is located on the exterior of the upper valve housing 7, and being made tubular in shape consists of the following: a check valve 22 to prevent back pressures and hot gases re-entering the compression chamber 14, a conventional type spark plug 23 (provision may be made for more spark plugs if necessary to provide the complete and homogeneous firing of gases depending upon the size of the engine).

Other components such as ignition coil, disrupter, carburetor or other similar parts or methods as oiling will not be detailed in this description, because they may be of any conventional type and will not be claimed as part of my invention.

The combustion chamber 19 is separated from the engine body and stator 1 or valve housing 7, in order to control the temperature of combustion, thus ensuring higher thermal efficiency. The outer surface of the stator 1 is provided with cooling fins 24 to maintain a low temperature in the intake and the compression phases of the whole cycle. The internal cooling mechanism is included with rotor description.

The rotor 5 has the following components: a cylinder having two impeller vanes 25 (this number of said impeller vanes as well as set of valves 8 and 13 may be increased according to the size of the engine). These impeller vanes 25 have two distinctive curves 26 and 27. The curve 26 is designed in such a manner that it pushes upward the valves with a constant acceleration, to keep as low as possible the kinetic energy spent in moving the valves and the curve 27 is designed to regulate downward movement of the valves with a higher rate of acceleration.

The impeller vanes 25 are equipped also with rollers 11 similar to the valves 8 and 13 located in grooves 28, which keep the rotor 5 sealed to stator's inside wall by reason of the rotation's centrifugal force. On the edges of said roller 11 there are vertical bar metallic seals 29 located in grooves 30 similar to groove 28.

The rotor is equipped also with metallic ring seals 31 located in their own circular grooves 32. Both seals 29 and 31 are held against the stator end covers 2 by the effect of the pressure supplied from the channels 33 from compressed gases conducted from beneath the roller 11, the end of channels 33 being located in groove 28.

The rotor 5 has two end covers 34 which by conveniently designed braces 35 are held to the shaft 4. On the braces are the blades 36 which propeller-like, force the air into the rotor inside or expel it from the other end through the openings 37 and 6 thereby providing air circulation for internal cooling.

*Operation*

The foregoing being the description of particular component parts involved in my invention, the following will be the explanation of the function of the aforesaid in the complete cycle of converting the thermal energy of the fuel to mechanical energy.

The whole composition of the above components, together with the conventional components heretofore mentioned, is designed to produce a complete thermo-mechanical cycle similar to the conventional piston-cylinder engines. This rotary engine operates as follows. Once the starting motion begins, the intake takes place in intake chamber 9, from the intake entry 38 a mixture of fuel and fresh air is supplied through a conventional carburetor. Following the rotation direction one impeller vane crosses the valve 8 and the fresh air-fuel mixture is then compressed in the compression chamber 14 until the compression ratio reaches a pre-set value, then the valve 13 is pushed upward by the curve 27 of impeller vane 25 to open the entry port 18, held closed until this moment by subvalve 17 to let the passage of compressed air-fuel mixture into combustion chamber 19. Immediately after the entry of all mixture into the chamber 19 ignition occurs and check valve 22 prevents back flows; meanwhile the impeller vane 25 crosses the valve 13 which returns to its original position closing entry port 18 with subvalve 17 and opening the entry port 21 to expansion chamber 15 where the gases expand propelling the impeller vane 25 forward providing mechanical force which is transmitted by the braces 35 of the rotor 5 to the shaft 4. When the impeller vane 25 crosses the valve 8 the burnt and expanded gases pass through exhaust port 39 to a conventional muffler completing the whole thermo-mechanical cycle.

As it is seen by the foregoing explanation, my invention permits the realisation of a complete thermo-mechanical cycle in a different manner from that of conventional piston-cylinder engines. It is also clear that my design is entirely different from that of similar engines previously designed but never marketed due to their complexity.

By my arrangement I have designed a very simple, different and efficient engine which requires a minimum number of parts. However, it is apparent that further embodiments of my invention will become apparent to those skilled in the art, and these are contemplated in the claims which follow.

While I have herein shown and described only a single form of construction embodying the features of my invention, still I do not intend to limit myself to the said form, because changes in details may be made without departing from the spirit or scope of the invention.

The embodiments of the invention in which an exclusive property or privilege is claimed are defined as follows.

I claim:

1. A rotary internal combustion engine comprising a stator having end covers, a rotor revoluble in the stator on a shaft mounted in the end cover, at least two impeller vanes mounted on said rotor, at least one compression valve member and at least one exhaust valve member adapted for sliding movement in guide members carried by said stator, said valve members being adapted to reciprocate radially with respect to the axis of rotation of said rotor and to maintain sealing contact with said rotor; said stator, rotor, impeller vanes and valve members defining at least one compression and at least one expansion chamber, bar seals between the ends of said rotor and said end covers, roller bars between the ends of said impeller vanes and the inside periphery of said stator, vertical and horizontal bar seals between said valve members and said guide members and roller bars between the ends of said valve members and said rotor, all said bar seals and roller bars serving to tightly seal said compression and expansion chambers; at least one combustion chamber carried on the outside of said stator whereby the combustion temperatures may be more readily controlled and having passages communicating with both said compression and expansion chambers; cooling fins on the outside periphery of said stator in the region of said compression chambers; propeller fins mounted on braces on the inside periphery of said rotor to insure internal cooling thereof by providing forced air circulation therein; and secondary valve members carried by said compression valve members to intermittently shut off the communicating passages between said combustion chambers and said compression chambers whereby to prevent compressed gases from entering said combustion chambers other than at predetermined timed intervals.

2. A rotary internal combustion engine as claimed in claim 1, including channels within said rotor leading from said compression chambers to the bar seals on said rotor and channels within said valve members and leading from said combustion chambers to the bar seals on said valve members whereby all said bar seals are urged into sealing positions by means of fluid pressures from behind.

3. A rotary internal combustion engine as claimed in claim 1 in which the said impeller vanes are provided with curved surfaces to provide valve member movements of constant acceleration.

4. A rotary internal combustion engine as claimed in claim 1 in which both ends of said shaft extend outside of said end covers whereby either end of said shaft may be used for power take off for desired direction of rotation.

5. A rotary internal combustion engine as claimed in claim 2, in which the said impeller vanes are provided with curved surfaces to provide valve member movements of constant acceleration.

6. A rotary internal combustion engine as claimed in claim 2, in which both ends of said shaft extend outside of said end covers whereby either end of said shaft may be used for power take off for desired direction of rotation.

References Cited in the file of this patent

UNITED STATES PATENTS

| | | |
|---|---|---|
| 1,340,563 | Schmid | May 18, 1920 |
| 1,705,359 | Erb | Mar. 12, 1929 |
| 1,846,298 | Alcznauer | Feb. 23, 1932 |
| 1,968,729 | Winsor et al. | July 31, 1934 |
| 2,231,440 | Fess | Feb. 11, 1941 |
| 2,713,770 | Johnson | July 26, 1955 |